United States Patent [19]

Trethewey

[11] Patent Number: 5,441,095
[45] Date of Patent: Aug. 15, 1995

[54] DETACHABLY MOUNTED WINDSHIELD SCREEN

[76] Inventor: Brig E. A. Trethewey, 4238 N. 68th Pl., Scottsdale, Ariz. 85251

[21] Appl. No.: 179,119

[22] Filed: Jan. 10, 1994

[51] Int. Cl.⁶ .............................................. B60J 1/20
[52] U.S. Cl. ...................... 160/370.21; 24/304; 24/662
[58] Field of Search ............. 160/370.2 R, 354, 368.1, 160/327; 296/97.7, 97.8, 97.9; 24/304, 90 HA, 662, 459, 462, 108, 682, 72.5

[56] References Cited

U.S. PATENT DOCUMENTS

| | | | |
|---|---|---|---|
| D. 310,195 | 8/1990 | Ruimi | D12/155 |
| 1,158,005 | 10/1915 | Richards, Jr. | |
| 1,883,791 | 10/1932 | Jewell | |
| 1,953,877 | 4/1934 | Chase | |
| 2,331,600 | 10/1943 | Dillow | 296/84 |
| 2,548,004 | 4/1951 | Duefrene | 24/662 |
| 2,706,659 | 4/1955 | Landis | 296/97 |
| 2,907,384 | 10/1959 | Spratt et al. | 160/368 |
| 2,944,601 | 7/1960 | Compson | 160/370.2 R |
| 3,006,048 | 10/1961 | Windish | 24/16 |
| 3,025,098 | 3/1962 | Andrews | 296/97 |
| 3,140,115 | 7/1964 | Bliss | 296/95 |
| 3,152,376 | 10/1964 | Boser et al. | 24/216 |
| 3,162,920 | 12/1964 | Durham | 24/265 |
| 3,184,264 | 5/1965 | Ealey et al. | 296/95 |
| 3,206,818 | 9/1965 | Knowlton | 24/90 HA |
| 3,225,408 | 12/1965 | Durham | 24/265 |
| 3,263,736 | 8/1966 | Macomson | 160/368 |
| 3,338,293 | 8/1967 | Hohmann | 160/368 |
| 3,613,181 | 10/1971 | Taylor | 24/216 |
| 3,649,089 | 3/1972 | Zip | 206/72 D |
| 3,715,783 | 2/1973 | Parks et al. | 24/265 R |
| 4,049,036 | 9/1977 | Gebhardt | 150/52 K |
| 4,109,957 | 8/1978 | Polizzi et al. | 296/95 C |
| 4,181,350 | 1/1980 | Eichstaedt | 160/370.2 R X |
| 4,261,649 | 4/1981 | Richard | 350/276 R |
| 4,406,246 | 9/1983 | DeMeyer et al. | 118/505 |
| 4,442,881 | 4/1984 | Monteath et al. | 160/25 |
| 4,502,256 | 3/1985 | Hahn | 24/459 X |
| 4,560,251 | 12/1985 | Murjahn | 350/283 |
| 4,597,608 | 7/1986 | Duffy | 296/95 C |
| 4,607,875 | 8/1986 | McGirr | 296/97 C |
| 4,624,092 | 11/1986 | Baginski | 24/459 X |
| 4,631,887 | 12/1986 | Francovitch | 24/459 X |
| 4,635,993 | 1/1987 | Hooper et al. | 296/95 C |
| 4,688,304 | 8/1987 | Marcott | 24/459 |
| 4,702,517 | 10/1987 | Meada et al. | 296/214 |
| 4,726,406 | 2/1988 | Weatherspoon | 150/52 K |
| 4,736,980 | 4/1988 | Eubanks | 296/97 D |
| 4,746,162 | 5/1988 | Maness | 296/97 R |
| 4,768,823 | 9/1988 | Martinez | 296/95 C |
| 4,790,591 | 12/1988 | Miller | 160/370.2 |
| 4,841,706 | 6/1989 | Resan | 24/90 HA X |
| 4,842,322 | 6/1989 | Iu | 296/97.7 |
| 4,848,825 | 7/1989 | Niernberger | 296/95.1 |
| 4,872,721 | 10/1989 | Sniadach | 296/97.2 |
| 4,903,748 | 2/1990 | Foraker | 160/370.2 |
| 4,972,892 | 11/1990 | Yeh | 150/166 |
| 5,014,758 | 5/1991 | Stinson | 150/168 |
| 5,037,156 | 8/1991 | Lundberg | 296/95.1 |
| 5,074,014 | 12/1991 | Freeman | 24/714.6 |
| 5,080,309 | 1/1992 | Ivins et al. | 248/205.8 |
| 5,087,005 | 2/1992 | Holoff et al. | 248/205.8 |
| 5,168,605 | 12/1992 | Bartlett | 24/519 |
| 5,176,357 | 1/1993 | Hobart | 248/683 |
| 5,201,913 | 4/1993 | Vliet | 294/64.1 |

*Primary Examiner*—David M. Purol
*Attorney, Agent, or Firm*—Cahill, Sutton & Thomas

[57] ABSTRACT

A detachably mounted screen for vehicular windshields and the like protects the windshield against an accumulation of snow, ice, or frost and permits removal of any snow, ice or frost by detaching the screen from the windshield. The screen also protects against the damaging effects of hail, wind driven sand or other particulate matter and may serve as a shield against or filter for solar, ultraviolet or other impinging radiation. Adhesively attached posts are secured proximate the perimeter of the windshield for snap fit engagement by a socket supporting a lever. A cap retains a segment of the screen upon the socket. Upon securing each socket to its respective post, the screen is attached adjacent the windshield and by manipulating each lever, the attendant socket is releasable from its respective post to permit detachment of the screen.

21 Claims, 1 Drawing Sheet

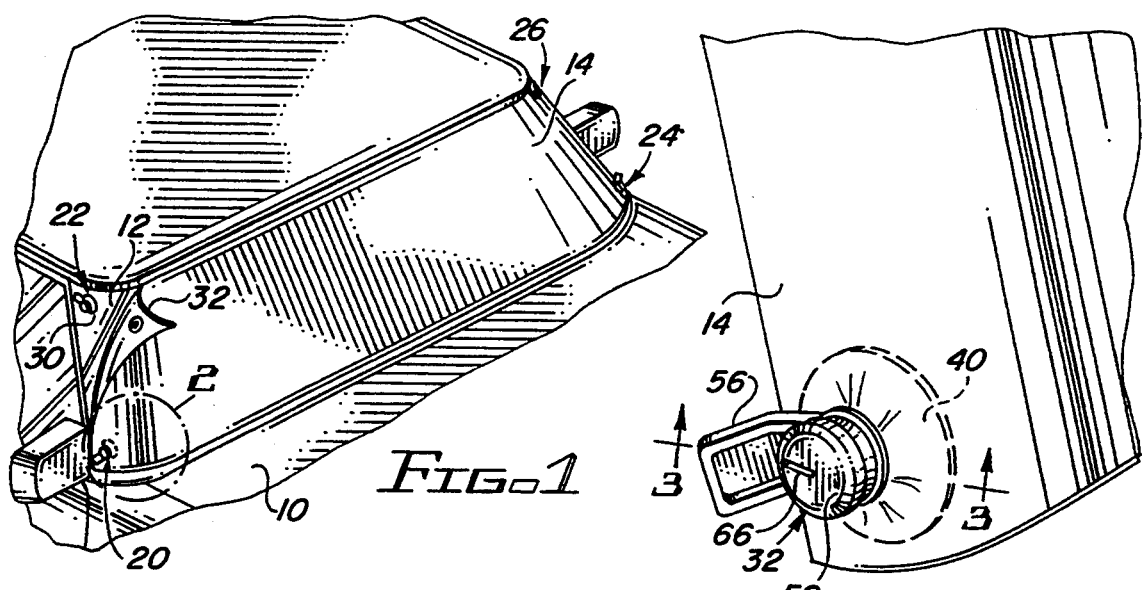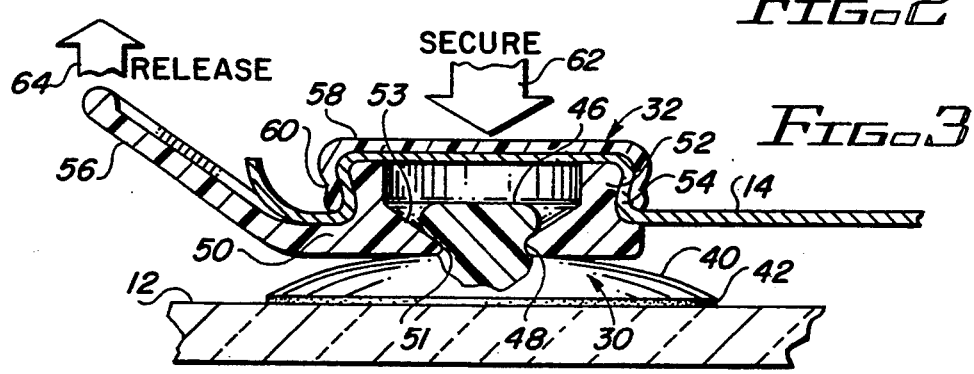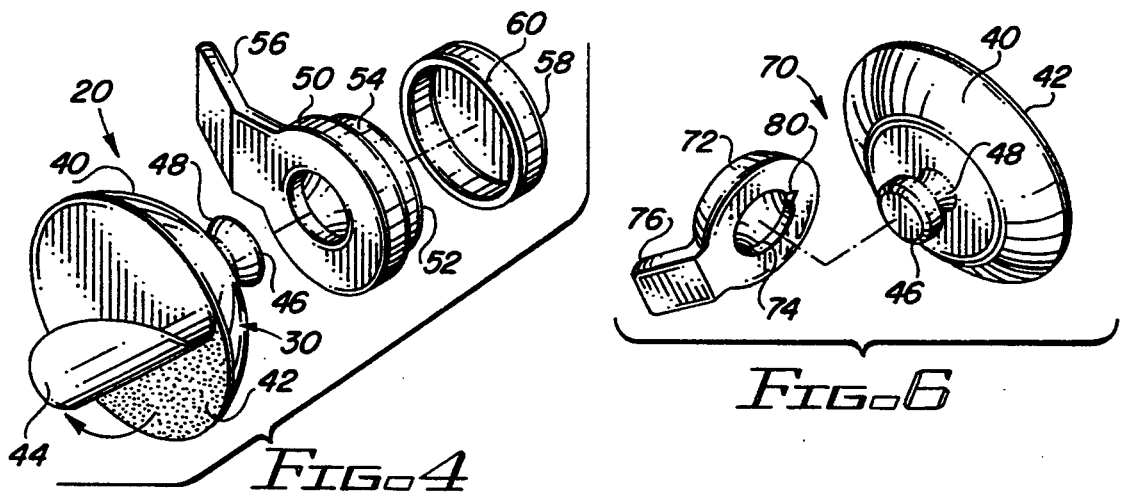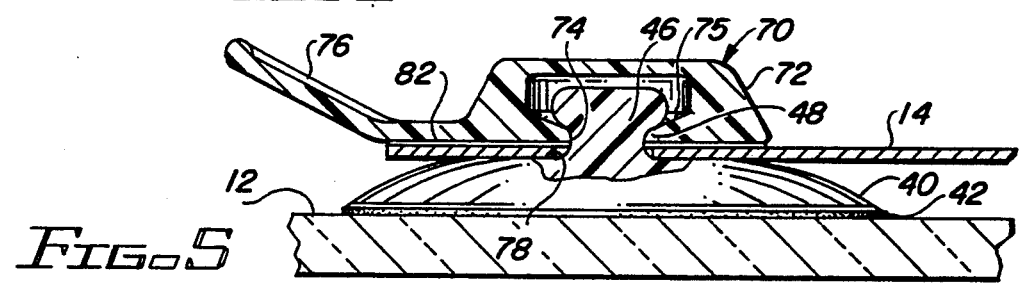

DETACHABLY MOUNTED WINDSHIELD SCREEN

BACKGROUND OF THE INVENTION

1. Field of the Invention

The present invention relates to screens and, more particularly, externally mounted screens for vehicular windows.

2. Description of the Prior Art

In northern climates the accumulation of snow, ice or frost upon windshields of vehicles parked outside occurs throughout the cold season. Removal of such snow, ice or frost with scrapers or other implements useful for this purpose is an ongoing effort by the drivers of the vehicles. Such removal is time consuming, irritating and generally unpleasant. Moreover, the implement used may scratch the windshield or window unless it is of sufficiently soft plastic, wood or other material. There is also an ongoing danger of damaging a segment of the seal at the perimeter of the windshield or window. Non-judicious use of the implement may result in scratching or damage to the painted surfaces adjacent the windshield or window. For all of these reasons, an impetus has been present for years to develop a shield or screen of some type to avoid accumulation of snow, ice or frost on a vehicular windshield or window, which screen is readily mountable and dismountable.

Various devices have been developed to provide a temporary cover for the windshield of a vehicle to be used during inclement weather conditions. Such covers may be of natural or man made fabric or sheet material. The attachment mechanism(s) for windshield covers usually include devices anchored to the surface of the body work of the vehicle generally adjacent to the perimeter of the windshield. Certain of the devices require an anchor post penetrably engaged with the body work of the vehicle. Other devices require engagement of the perimeter of the windshield interior of the windshield retaining seals and associated elements. Some devices are detachably detachable to the body work in a non-permanent manner. All of such attachment devices are either difficult or expensive to install upon the body work. For magnetic and related detachably attachable attachment devices, their utility under wind or inclement weather conditions is highly suspect. Certain of the known attachment devices are susceptible to inoperability in the presence of ice and therefore become useless during inclement weather conditions.

SUMMARY OF THE INVENTION

A flexible base of each of a plurality of posts are adhesively secured adjacent selected points along the perimeter of a vehicular windshield or window. A socket, having a lever extending therefrom, engages each post with a snap fit. A snap fit cap frictionally secures a segment of a screen draped over the socket. After engagement, removal of the screen may be effected by prying the lever upwardly or by pushing the lever down to dismount the socket and attached screen. The screen, sized commensurate with the windshield or window to be protected, may be of opaque or transparent material to shield the windshield or window against an accumulation of snow, ice and frost. Moreover, the screen will protect the windshield or window against the damaging effect of blowing sand or particulate matter. Depending upon the composition of the screen, it may also serve as an effective shield or filter against transmission of solar, ultraviolet or other impinging radiation.

It is therefore the primary object of the present invention to provide an easily removable screen mountable upon a surface.

Another object of the present invention is to provide a removable screen for protecting vehicular windshields against an accumulation of snow, ice or frost.

Another object of the present invention is to provide an easily detachable screen mountable upon the windshield of a vehicle.

Yet another object of the present invention is to provide an externally detachably mounted screen for preventing transmission of solar and ultra-violet radiation though a window.

Still another object of the present invention is to provide a mounting for securing a segment of material to a surface which mounting does not require penetration of the material.

A further object of the present invention is to provide a snap fitting for securing a segment of material to a mounting post.

A yet further object of the present invention is to provide an inexpensive non-damaging mounting for securing a segment of a screen to a vehicular window.

A still further object of the present invention is to provide a lever for detaching a screen supporting snap fit socket from a mounting post.

A still further object of the present invention is to provide a snap fitting for securing a segment of material to a mounting post, which snap fitting and post do not require use of any tools to mount them or to engage and disengage them from one another.

These and other objects of the present invention will become apparent to those skilled in the art as the description there proceeds.

BRIEF DESCRIPTION OF THE DRAWINGS

The present invention may be described with greater specificity and clarity with reference to the following drawings, in which:

FIG. 1 illustrates a perspective view of a screen mounted upon the windshield of a vehicle;

FIG. 2 is a detail view taken within circle 2 shown in FIG. 1;

FIG. 3 is a cross-sectional view taken along Lines 3—3, as shown in FIG. 2;

FIG. 4 is an exploded view of the elements of the mounting for securing a screen in place;

FIG. 5 is a cross-sectional view of a variant mounting;

FIG. 6 is an exploded view illustrating engagement/disengagement of the parts of the variant shown in FIG. 5.

DETAILED DESCRIPTION OF THE PREFERRED EMBODIMENTS

Referring to FIG. 1, there is illustrated a conventional automotive vehicle 10 having a windshield 12. During periods of cold weather it is normal for frost to form overnight on the windshield. Before the vehicle can be driven safely, it is necessary to scrape all or at least most of the frost off the windshield. Such scraping is irritating and if the temperature is low enough, severely uncomfortable. Moreover, there is always a danger of scratching the windshield unless a plastic or wooden scraper is used and there is a further danger of scratching or otherwise marring the parts of the vehicle surrounding the windshield or the rubber or plastic seal at the perimeter of the windshield. In cold inclement weather snow and/or ice may form on the windshield which must be removed. Such removal is no less irritating or potentially more damaging than frost removal. To avoid accumulation of frost, snow or ice upon windshield 12, a sheet 14 of material sized to generally conform with the windshield is placed upon the windshield. Any frost, snow or ice that would normally accumulate on the windshield will then accumulate upon the sheet. The accumulated frost, snow or ice is disposed of by simply removing sheet 14 from windshield 12. Thereafter, the sheet may be folded or rolled for storage purposes.

To retain sheet 14 in place and to keep it in place despite wind or other disturbing influences, each of a plurality of mounting assemblies 20, 22, 24, 26 is mounted on one of the four corners of windshield 12. Additional mounting assemblies may be located at the mid-point of the windshield or at other points, depending upon the size and configuration of the windshield. Each mounting assembly includes a post element 30 secured to the windshield and a snap fit element 32 supporting sheet 14. The detachable attachment of the snap fit element with the post element permits facile mounting and dismounting of sheet 14 adjacent windshield 12.

Referring jointly to FIGS. 2, 3 and 4, further details attendant each of the mounting assemblies 20, 22, 24 and 26 will be described. A base 40 of post element 30, which may be circular as illustrated, is adhesively secured to windshield 12 by a roundel 42 of adhesive. As shown in FIG. 4, a protected cover 44 may be attached to roundel 42 prior to installation. A boss 46 extends from base 40 and includes an undercut 48. Preferably, the boss and the undercut are annular, as illustrated. Snap fit element 32, mountable upon boss 46, includes a socket 50 having an aperture or inlet 51 for engaging boss 46 in a snap fit manner and a cavity 53 for receiving the boss. A circular shroud 52 of the socket includes an annular indentation or undercut 54. A lever 56 extends from the side of socket 50.

Sheet 14 is attached to snap fit element 32 by draping a segment of the sheet over shroud 52. A cap 58 includes an inwardly extending circular sidewall 60 for engaging indentation 54. Upon pressing cap 58 over the segment of sheet 14 draped over shroud 52, sidewall 60 will matingly and grippingly engage undercut 54 of shroud 52 to secure sheet 14 with snap fit element 32.

In operation, a base 40 is secured to windshield 12 proximate on each of the corners of the windshield, as illustrated in FIG. 1 after removal of cover 44 to obtain contact between the windshield and roundel 42 of adhesive. To mount sheet 14 upon post element 30, cap 58 of snap fit element 32 is gripped to place socket 50 adjacent boss 46. By applying some pressure, a snap fit will result and the socket will become secured upon and about the boss. This procedure is repeated for each of mounting assemblies 20, 22, 24 and 26 to secure sheet 14 adjacent windshield 12.

To remove sheet 14, lever 56 of each of snap fit elements 32 is drawn away from the windshield, as depicted by arrow 64 in FIG. 3. Alternatively, the lever may be pressed toward the windshield. The corresponding re-orientation of socket 50 with respect to boss 46 will result in disengagement of inlet 51 of the socket from the boss. That is, there will be a lifting of the socket near the lever if the lever is pulled or a lifting of the socket on the far side of the lever if the lever is pushed. Thereby, sheet 14 will be released from each of post elements 30 of the mounting assemblies 20, 22, 24 and 26. Indicia 66, such as a marked line, ridge or depression may be disposed on cap 58 in general alignment with lever 56 to assist in locating the lever should it be covered by sheet 14. As shown in FIG. 2, lever 56 may extend beyond the perimeter of sheet 14 to facilitate gripping of the lever.

Referring jointly to FIGS. 5 and 6, there is shown a variant 70 of one of mounting assemblies 20, 22, 24 or 26. The variant includes a base 40 having a roundel 42 of adhesive for securing the base to windshield 12. Boss 46, extending from base 40 includes undercut 48. A socket 72 includes an aperture or inlet 74 for snap fit engagement with undercut 48 of boss 46 and a cavity 75 for receiving the boss. A lever 76 extends from socket 72 to facilitate detachment of the socket from boss 46. Sheet 14 includes an aperture 78 for penetrably receiving boss 46.

To secure sheet 14 to base 40 of variant 70, the sheet is placed adjacent base 40 to permit boss 46 to penetrably engage aperture 78 in the sheet. The penetrated segment of the sheet is retained adjacent base 40 by forcing socket 72 onto boss 46 in a snap fit manner. Thereby, disengagement of sheet 14 from boss 46 is prevented by socket 72.

To remove sheet 14 from retaining engagement adjacent windshield 12, lever 76 is forced away from the windshield. The resulting forces acting upon socket 72 will result in disengagement of inlet 74 of the socket from boss 46. Thereafter, sheet 14 may be lifted off the boss. To facilitate removal of either socket 50 or variant 70, a slit or groove may be formed in the undercut (48) or the inlet (74) to permit expansion of the undercut or inlet upon removal. For illustrative purposes, such a slit or groove is depicted in FIG. 6 and identified by numeral 80. To prevent a potential loss of socket 72 between exercise of the steps of mounting and dismounting sheet 14, the socket may be secured to the sheet in circumscribing relationship with aperture 78 by adhesives, thermal forming processes, chemical welding, heat welding, etc., as suggested by layer 82.

While the above description of the invention had been directed to a detachable mounting of a sheet of material adjacent the windshield of a vehicle, it is to be appreciated that mounting assembly 20 or variant 70 may be used to detachably attach sheet material to any vehicle surface, such as other windows on the vehicle. Mounting assembly 20 or variant 70 may be used also in conjunction with any other surface, whether or not vehicular related, which is to be intermittently protected by a sheet of material.

It is to be understood that the protective sheet of material may be opaque or it may be transparent; moreover, it may be a fabric of natural or man made materials. The sheet or fabric may be limp or self supporting. If it is transparent, it will not necessarily have to be removed prior to operation of the vehicle. Such embodiment is particularly useful when one must drive through a sand storm or under high wind conditions which might cause airborne particulate material to pit, crack or otherwise damage or contaminate a windshield. Similar considerations may suggest use of mounting assembly 20 or variant 70 in conjunction with intermittent mounting of a sheet of material for protective purposes adjacent other types of transparent or non-transparent surfaces.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A detachably mounted apparatus for covering a surface, said apparatus comprising in combination:
   a) a sheet of material for protecting the surface;
   b) a post mounted upon the surface;
   c) a socket for detachable attachment to said post;
   d) means for attaching said socket to said post;
   e) a cap mountable upon said socket for retaining said sheet intermediate said socket and said cap; and
   f) means for detaching said socket from said post.

2. The apparatus as set forth in claim 1 wherein said attaching means comprises a snap fitting.

3. The apparatus as set forth in claim 1 wherein said detaching means includes a lever extending from said socket.

4. The apparatus as set forth in claim 1 wherein said post includes a base and means for adhering said base to the surface.

5. The apparatus as set forth claim 1 wherein said sheet includes an aperture for penetrable engagement with said post.

6. The apparatus as set forth in claim 1 wherein said attaching means comprises an annular indentation about said post and an aperture disposed in said socket for receiving said post and for engaging said annular indentation in a snap fit.

7. The apparatus as set forth in claim 1 wherein said socket includes a cavity extending from said aperture for receiving said post.

8. The apparatus as set forth in claim 1 wherein said post includes a base for mounting upon the surface.

9. A detachably mounted apparatus for covering a surface, said apparatus comprising in combination:
   a) a sheet of material for protecting the surface;
   b) a post mounted upon the surface;
   c) a socket for detachable attachment to said post, said socket including a cavity extending from said aperture for receiving said post;
   d) an annular indentation disposed about said post;
   e) an aperture disposed in said socket for receiving said post and for engaging said annular indentation in a snap fit;
   f) a cap for engaging said socket to retain said sheet between said cap and said socket; and
   g) means for detaching said socket from said post.

10. The apparatus as set forth in claim 9 wherein said sheet includes an aperture for receiving said socket.

11. A mounting assembly for securing a sheet of material to a surface, said assembly comprising in combination:
    a) a post element mounted upon the surface, said post element including a boss having an annular indentation;
    b) a socket having a cavity for receiving said boss and an inlet for snap fit engagement with said annular indentation;
    c) a cap for securing a segment of the sheet draped over said socket to said socket;
    d) a lever extending from said socket to accommodate manipulation of said socket to disengage said socket from said boss; and
    e) means for mounting said post element upon the surface.

12. The apparatus as set forth in claim 11 wherein said post element includes a base for supporting said boss and adhesive means for adhering said base to the surface.

13. The apparatus as set forth in claim 11 wherein said socket includes a shroud having an annular indentation and wherein said cap includes a sidewall for gripping engagement with said annular indentation.

14. The apparatus as set forth in claim 12 wherein said post element includes a base for mounting upon the surface.

15. The apparatus as set forth in claim 14 including adhesive means for adhering said base to the surface.

16. A mounting assembly for securing a sheet of material to a surface, said assembly comprising in combination:
    a) a post element mounted upon the surface, said post element including a boss having an annular indentation;
    b) a socket having a cavity for receiving said boss and an inlet for snap fit engagement with said annular indentation;
    c) a cap for securing a segment of the sheet to said socket;
    d) a lever extending from said socket to accommodate manipulation of said socket to disengage said socket from said boss; and
    e) means for mounting said post element upon the surface.

17. The apparatus as set forth in claim 16 wherein said post element includes a base for supporting said boss and adhesive means for adhering said base to the surface.

18. The apparatus as set forth in claim 17 wherein said socket includes a shroud having an annular indentation and wherein said cap includes a sidewall for gripping engagement with said annular indentation.

19. The apparatus as set forth in claim 16 including an aperture disposed in the segment of the material for penetrable engagement by said post element to locate the material intermediate said post element and said cap.

20. The apparatus as set forth in claim 16 wherein said post element includes a base for mounting upon the surface.

21. The apparatus as set forth in claim 20 including adhesive means for adhering said base to the surface.

* * * * *